(12) United States Patent
Xiong et al.

(10) Patent No.: US 7,817,542 B2
(45) Date of Patent: Oct. 19, 2010

(54) METHOD AND NETWORK DEVICE FOR FAST SERVICE CONVERGENCE

(75) Inventors: Yi Xiong, Guangdong Province (CN); Jian Li, Guangdong Province (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 391 days.

(21) Appl. No.: 11/993,431

(22) PCT Filed: Jun. 21, 2007

(86) PCT No.: PCT/CN2007/070154

§ 371 (c)(1),
(2), (4) Date: Dec. 20, 2007

(87) PCT Pub. No.: WO2008/022574

PCT Pub. Date: Feb. 28, 2008

(65) Prior Publication Data

US 2010/0061230 A1    Mar. 11, 2010

(30) Foreign Application Priority Data

Aug. 17, 2006  (CN) .................. 2006 1 0112187

(51) Int. Cl.
*G06F 11/00* (2006.01)
(52) U.S. Cl. .................. 370/228; 370/244; 370/248
(58) Field of Classification Search .................. 370/225, 370/227, 228, 216, 217, 218, 242, 244, 252, 370/395.31, 395.32, 248
See application file for complete search history.

(56) References Cited

U.S. PATENT DOCUMENTS

2003/0035414 A1* 2/2003 Beyda .................. 370/352

2004/0088431 A1  5/2004 Carter .................. 709/240

(Continued)

FOREIGN PATENT DOCUMENTS

CN    1933448 A    3/2005

(Continued)

OTHER PUBLICATIONS

European Patent Office Communication pursuant to Article 94(3) EPC for Application No. 07 721 772.7, dated Sep. 14, 2009, 4pgs.

(Continued)

*Primary Examiner*—Brian D Nguyen
(74) *Attorney, Agent, or Firm*—Finnegan, Henderson, Farabow, Garrett, Dunner LLP

(57) ABSTRACT

A method and network device for fast service convergence, used for communications between Autonomous Systems, includes: presetting a route forwarding table, each forwarding table item in the forwarding table includes information of a preferred route and a secondly-preferred route; setting the status of the preferred route as unavailable in the forwarding table item after a failure is detected in the preferred route; after receiving a service packet, querying in the route forwarding table the forwarding table item corresponding to the service packet, and determining whether the status of the preferred route is available, and if yes, the service packet is forwarded through the preferred route, otherwise through the secondly-preferred route. Because the failure detection time is not longer than 30 ms, the switch time of the service packet from the preferred route to the secondly-preferred route may be within 50 ms, thereby enabling fast service convergence.

9 Claims, 3 Drawing Sheets

U.S. PATENT DOCUMENTS

| | | | |
|---|---|---|---|
| 2005/0005190 A1* | 1/2005 | Ofir et al. | 714/4 |
| 2005/0071502 A1 | 3/2005 | Kamat et al. | 709/239 |
| 2006/0047851 A1* | 3/2006 | Voit et al. | 709/239 |
| 2006/0062199 A1 | 3/2006 | Yoshizawa | 370/351 |
| 2006/0126502 A1 | 6/2006 | Vasseur | |
| 2006/0221813 A1* | 10/2006 | Scudder et al. | 370/216 |
| 2006/0291391 A1* | 12/2006 | Vasseur et al. | 370/235 |
| 2007/0008982 A1* | 1/2007 | Voit et al. | 370/401 |
| 2007/0091796 A1* | 4/2007 | Filsfils et al. | 370/228 |
| 2007/0214280 A1* | 9/2007 | Patel et al. | 709/239 |

FOREIGN PATENT DOCUMENTS

| | | |
|---|---|---|
| CN | 1705256 A | 12/2005 |
| WO | 2005/039085 A | 4/2005 |
| WO | 2006/053497 A | 5/2006 |

OTHER PUBLICATIONS

First Office Action of the State intellectual Property Office of the PRC for Application No. 200610112187.X, dated Aug. 15, 2008, 4 pgs., English translation attached.

* cited by examiner

METHOD AND NETWORK DEVICE FOR FAST SERVICE CONVERGENCE

This application claims the priority of China patent application No. 200610112187.X filed with China Patent Office on Aug. 17, 2006, entitled "METHOD AND NETWORK DEVICE FOR FAST SERVICE CONVERGENCE", which is incorporated herein by reference in its entirety.

FIELD OF THE INVENTION

The present invention relates to the field of network and communication technologies, and particularly to a method and a network device for fast service convergence.

BACKGROUND OF THE INVENTION

With the rapid development of networks, the demand for Triple play service is becoming increasingly urgent, and when a failure occurs in the network, the operator concerns much about the speed of service convergence. An end-to-end service convergence being conducted within 50 ms when a failure occurs at any node has become a base benchmark for a bearer network.

To meet the requirement that an end-to-end service convergence is conducted within 50 ms, the route fast convergence technologies such as Multi-Protocol Label Switch (MPLS), the Traffic Engineering Fast Re-Routing (TE FRR) and the Interior Gateway Protocol (IGP) have emerged as the times require. However, all these technologies are used for dealing with the fast service convergence or switch upon a link failure within the domain of an Autonomous System, and are not applicable to a link failure between Autonomous System Border Routers (ASBRs). In a practical networking application, a plurality of nodes in one Virtual Private Network (VPN) may be connected to multiple service providers using different Autonomous Systems (ASs), or to multiple as of one service provider. Such a VPN, which is used across a plurality of ASs, is referred to as an Inter-Autonomous System (Inter-AS) VPN.

A conventional technical solution of a fast service convergence upon a link failure between as according to the prior art is described below. Referring to FIG. 1, a schematic diagram of an Inter-AS networking with rectangle connection is shown. When a link failure occurs between ASBR1 and ASBR3, the link failure can be perceived by the ASBR1 and ASBR3 through a link detection method. A route protocol convergence is performed between the ASBR1 and ASBR3 through the Multi-protocol extensions for EBGP 4 (MP-EBGP) protocol, with a need to remove all routes of the Inter-AS VPN routes that have been learned by the ASBR1 and ASBR3 through the MP-EBGP respectively. All of the Provider Edge Device (PE) routers within the domain are notified, through the route protocol of Multi-protocol extensions for IBGP4 (MP-IBGP4) in the domain, that the ASBR1 or ASBR3 with the failure does not have Inter-AS routes any more and can not forward services any more. The PE routers within the domain conduct route convergence and find that some other Inter-AS routers such as ASBR2 and ASBR4 have available routes for the Inter-AS VPN, so the ASBR2 and ASBR4 are reselected as the remote next hop for the Inter-AS service respectively, and are reselected for forwarding. Thus the Inter-AS service is restored.

It can be seen from the above conventional technical solution that, when a link failure occurs between ASs, the service fast convergence is implemented with the method of route re-computation using the convergence of the routing protocol. However, the speed of the convergence of the routing protocol is relatively slow, especially for the Border Gateway Protocol routes transferred by using VPN routing information. According to the current technique level, the convergence time may attain approximate 1 s under the best conditions, while the average level of the converging is between 5 s-10 s. The services such as voice and video expect a convergence time of less than 50 ms, and only if such a switch speed is achieved, the voice and video bearer services will not be affected. Therefore, the time for service switch in the prior art can not meet the requirement for failure switch time of the services such as voice and video.

In addition, for a method using the convergence of a routing protocol, the convergence time is related to the number of the service routes, and the convergence time is increased as the number of the service routes increases greatly.

SUMMARY OF THE INVENTION

A method and a network device for fast service convergence are provided according to embodiments of the present invention, to achieve fast service convergence upon a link failure between Autonomous Systems.

A method for fast service convergence, used for the communications between Autonomous Systems, includes:

presetting a route forwarding table, each forwarding table item in the route forwarding table comprising information of a preferred route and a secondly-preferred route;

setting the status of the preferred route in the forwarding table item as unavailable if a failure is detected in the preferred route in the forwarding table item;

after receiving a service packet, querying in the route forwarding table a forwarding table item corresponding to the service packet, and determining whether the status of the preferred route in the forwarding table item is available, and if yes, forwarding the service packet through the preferred route; otherwise, forwarding the service packet through the secondly-preferred route.

A network device enabling fast service convergence, used for communications between Autonomous Systems, includes:

a storage unit, adapted to store information of each forwarding table item, each of the forwarding table item comprising information of a preferred route and a secondly-preferred route;

a detecting unit, adapted to detect the operation status of the routes;

a route status setting unit, adapted to set the route status, wherein, the route status setting unit sets the status of the preferred route in the forwarding table item of the storage unit as unavailable after the detecting unit detects that a failure occurs in the preferred route in the forwarding table item;

a service packet receiving unit, adapted to receive a service packet;

a route status querying unit, adapted to query route information related to a service packet and obtain information and status of the preferred route and the secondly-preferred route;

a service packet forwarding unit, adapted to forward a service packet in accordance with the information and status of the route obtained by the route status querying unit, and when the route status querying unit determines that the status of the preferred route is available, the service packet is forwarded through the preferred route; when the route status querying unit determines that the status of the preferred route is unavailable, the service packet is forwarded through the secondly-preferred route.

It can be seen from the above technical solution, according to the technical solution of the present invention, a route forwarding table is preset, and after it is detected that a failure occurs in the preferred route in the forwarding table item, the status of the preferred route is set as unavailable in the forwarding table item of the route forwarding table. After a service packet is received, the forwarding table item corresponding to the service packet is queried in the route forwarding table, and the status of the preferred route in the forwarding table item is determined. If it is determined that the status of the preferred route is available, the service packet is forwarded through the preferred route; otherwise, the service packet is forwarded through the secondly-preferred route. Because the perceiving time in the failure detection by the network device is not longer than 30 ms, and the route forwarding table is modified immediately when a failure is detected in the preferred route, the switching of the service packet from the preferred route forwarding to the secondly-preferred route forwarding can be accomplished rapidly. Therefore the time for service convergence can be limited within 50 ms, thereby meeting the time requirements for failure switching of the services such as voice and video.

Further, in the technical solution of the embodiment, the route forwarding table is set in the network device and the speed of service convergence is not dependent on the scale of the number of the service routes, thus avoiding the defect that the convergence time increases due to the enlarged scale of the number of the service routes.

DETAILED DESCRIPTION OF EMBODIMENTS

A method and a network device for fast service convergence are provided, which are used for communications between Autonomous Systems. The essential idea of the invention is to store a route forwarding information table including a preferred route and a secondly-preferred route in a forwarding engine of the network device, modify the forwarding information table when the network device detects a failure in the preferred route, and forward service packets through the secondly-preferred route.

Figure 2:
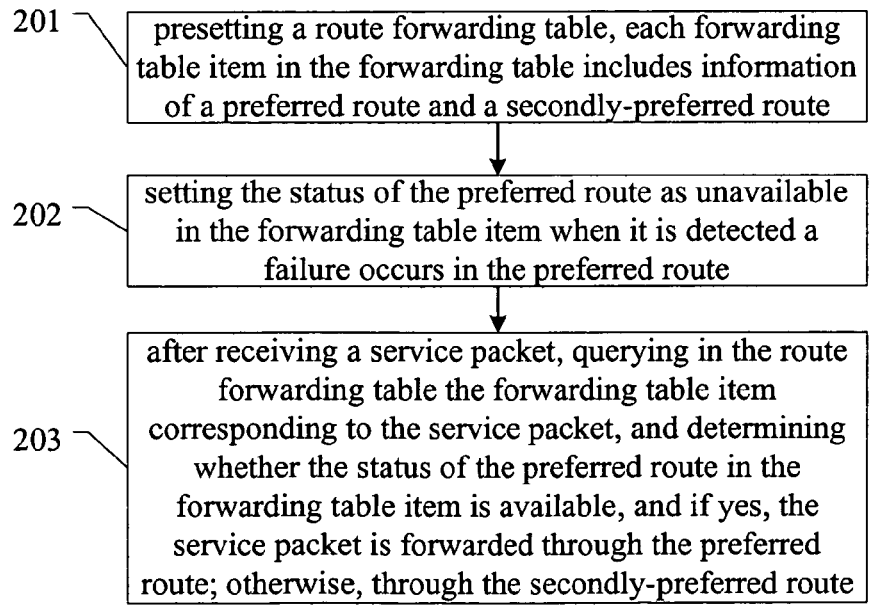
FIG. 2 is a flow chart of the method according to an embodiment of the present invention.

Referring to FIG. 2, a flow chart of the method according to the embodiment of the present invention is shown, including:

201. presetting a route forwarding table, each forwarding table item in the forwarding table includes information of a preferred route and a secondly-preferred route;

202. setting the status of the preferred route as unavailable in the forwarding table item after a failure is detected in the preferred route;

203. after receiving a service packet, querying, in the route forwarding table, the forwarding table item which corresponds to the service packet, and determining whether the status of the preferred route in the forwarding table item is available or not, and if the status of the preferred route is available, the service packet is forwarded through the preferred route; otherwise, the service packet is forwarded through the secondly-preferred route.

For further understanding the present invention, the technical method is described in detail in conjunction with the following embodiments.

The First Embodiment

For an ASBR, there exist a plurality of routes for the same one VPN prefix, including the routes distributed by the MP-EBGP neighbor and the routes distributed by the MP-IBGP.

Figure 1:
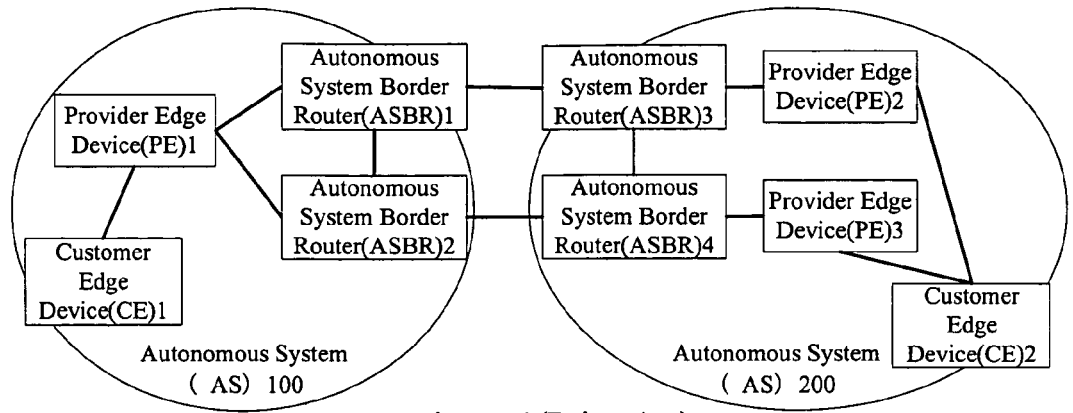
FIG. 1 is a schematic diagram of the Inter-AS networking with rectangle connection.
Figure 3:
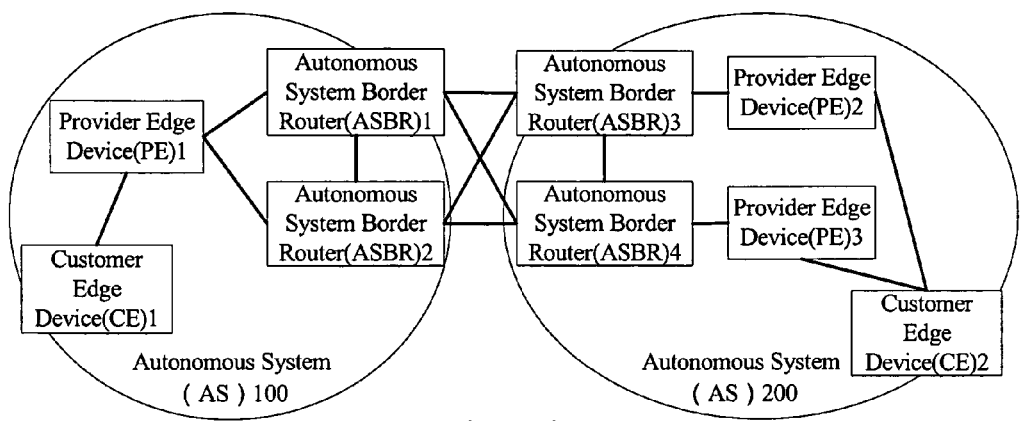
FIG. 3 is a schematic diagram of the Inter-AS networking with full connections.

Referring to FIGS. 1 and 3, for the ASBR1 in FIG. 1, there are two VPN routes on the ASBR1 for the routing of the Customer Edge Device 2 (CE2). One of the two VPN routes is distributed by the ASBR3 through the MP-EBGP, and the other is distributed by the ASBR2 through the MP-IBGP. Similarly, for the ASBR1 in FIG. 3, there are three VPN routes on the ASBR1 for the routing of the CE2. One of the three VPN routes is distributed by the ASBR3 through the MP-EBGP, another one is distributed by the ASBR4 through the MP-EBGP, and the still another one is distributed by the ASBR2 through the MP-IBGP.

At an ASBR, two VPN routes need to be selected for the same one prefix, one of which is preferred as a primary route (preferred route), and the other is not preferred and as a backup route (secondly-preferred route).

In FIG. 1, if the preferred path from the CE1 to the CE2 is as follows:

CE1-PE1-ASBR1-ASBR3-PE2-CE2, and when a failure occurs in the link between the ASBR1 and ASBR3, the path through which the CE1 accesses the CE2 is converged into:

CE1-PE1-ASBR2-ASBR4-PE3-CE2

In FIG. 3, substantially similarly, if the preferred path from the CE1 to the CE2 is as follows:

CE1-PE1-ASBR1-ASBR3-PE2-CE2, and when a failure occurs in the link between the ASBR1 and the ASBR3, the path through which the CE1 accesses the CE2 is converged into:

CE1-PE1-ASBR1-ASBR4-PE3-CE2

In FIG. 1, the preferred route distributed by the ASBR3 serves as the primary route, and the route distributed by the ASBR2 serves as the backup route. In FIG. 3, the preferred route distributed by the ASBR3 serves as the primary route, and the route distributed by the ASBR4 serves as the backup route.

Figure 4:
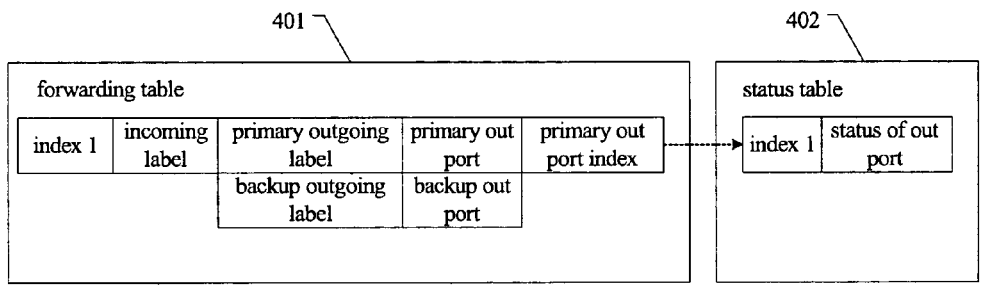
FIG. 4 is an exemplary diagram of the route forwarding table according to a first embodiment of the present invention.

Referring to FIG. 4, an exemplary diagram of the route forwarding table according to the first embodiment of the present invention is shown, and a forwarding table 401 and a status table 402 are included. For each VPN route on the Inter-AS ASBR routers, the forwarding table in FIG. 4 needs to be generated, including an incoming label, a primary outgoing label, a primary out port, a backup outgoing label, a backup out port and a primary out port index. The primary out port index in the forwarding table is associated with the status of the primary port in the status table.

The port includes a physical port, a logical channel or a next hop interface.

After a forwarded service packet reaches an ASBR, the ASBR queries the forwarding table for corresponding forwarding table items in accordance with the incoming label of the forwarded packet, and finds the status of the corresponding out port according to the primary out port index. If the status is available, the packet is forwarded through the primary outgoing label and the primary out port; otherwise, the packet is forwarded through the backup outgoing label and the backup out port.

After a failure occurs in the link between the ASBRs, the failure status is rapidly perceived by using fast detection mechanisms such as Link Status Fast Report, Bidirectional Forwarding Detection (BFD) Fast Detection or Operations Administration and Maintenance (OAM) Fast Detection, and then the status of the out port in the status table item is set as unavailable. The detection time is dependent on the mechanism of the fast perceiving. The typical perceiving time of the Link Status Fast Report mechanism is 1-3 ms, and the typical perceiving time of the BFD/OAM Fast Detection mechanism is 30 ms. It can be seen from the above forwarding mechanism that the service packet will be forwarded by using the backup route immediately after the status of the primary interface is set as unavailable. Therefore, the service switch of the Inter-AS service can be accomplished within 50 ms.

After the link between the ASBRs restores to availability, the ASBR detects that the primary route restores to availability, set the status of the out port in the status table item as available, and a service packet is switched back to and forwarded through the primary route.

The Second Embodiment

In the first embodiment, the primary and backup routes are adopted to implement the present invention. In the second embodiment, the approach of load sharing is adopted to implement the present invention.

Figure 5:
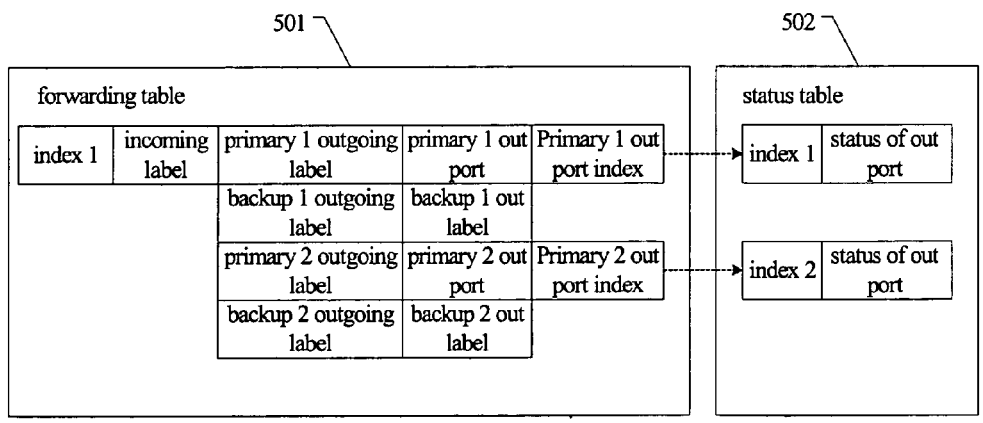
FIG. 5 is an exemplary diagram of the route forwarding table according to a second embodiment of the present invention.

Referring to FIG. 5, an exemplary diagram of the route forwarding table according to the second embodiment of the present invention is shown, including a forwarding table 501 and a status table 502. For each load sharing route, another load sharing route is selected as its backup route, and a forwarding table having a plurality of primary and backup load sharing table items is generated, with each primary out port index corresponding to one out port status.

First, for an ASBR, there exists a plurality of routes for the same one VPN prefix. Multiple VPN routes on the ASBR are selected preferably for the same one prefix, and then the selected multiple VPN routes are used in a load sharing manner for the VPN service.

After a service forwarding packet reaches an ASBR, the ASBR queries, in the forwarding table, corresponding forwarding table items in accordance with the incoming label of the forwarded packet, selects one table item among the plurality of load sharing table items. The status of the corresponding out port is searched according to a selected primary out port index. If the status is available, the packet is forwarded through the primary outgoing label and the primary out port; otherwise, the packet is forwarded through the backup outgoing label and the backup out port.

When a failure occurs in the link between ASBRs, the failure status is rapidly perceived using fast detection mechanisms such as Link Status Fast Report, Bidirectional Forwarding Detection (BFD) Fast Detection or Operations Administration and Maintenance (OAM) Fast Detection, and then the status of the out port in the forwarding table item is set as unavailable. The perceiving time is dependent on the fast perceiving mechanism, wherein the typical perceiving time of the Link Status Fast Report mechanism is 1-3 ms, and the typical perceiving time of the BFD/OAM Fast Detection mechanism is 30 ms. It can be seen from the above forwarding principle that the forwarding will be performed through the backup route immediately after one of the multiple load sharing routes becomes unavailable. Thus, the service switching of the Inter-AS service can be accomplished within 50 ms.

Figure 6:
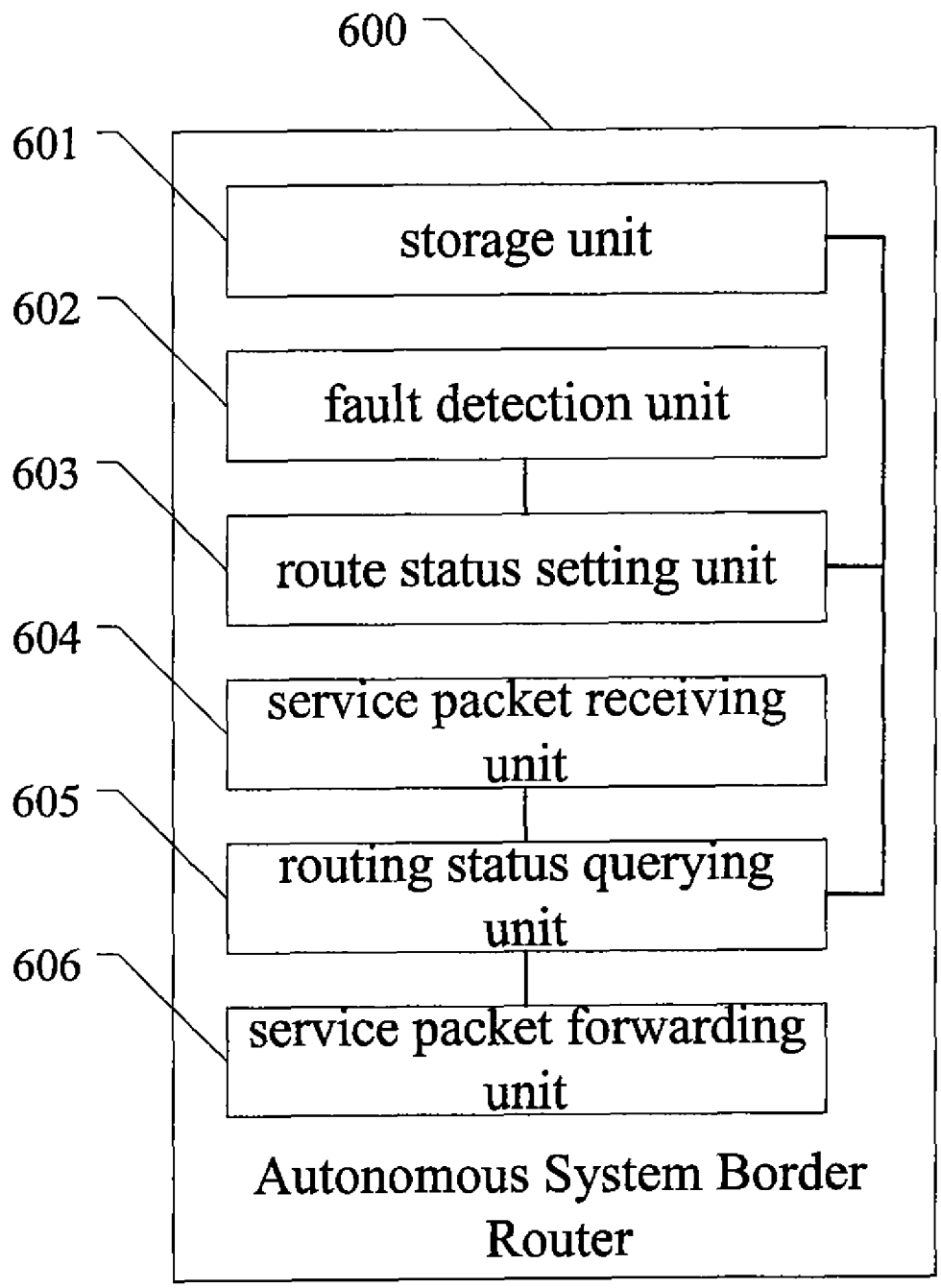
FIG. 6 is a structural schematic diagram of a router according to an embodiment of the invention.

Referring to FIG. 6, a structural schematic diagram of a router according to an embodiment of the invention is shown. An Autonomous System Border router 600 enabling fast service convergence and used for the communication between Autonomous Systems, includes a storage unit 601, a fault detection unit 602, a routing status setting unit 603, a service packet receiving unit 604, a routing status querying unit 605 and a service packet forwarding unit 606.

The storage unit 601 is used to store information of each forwarding table item. Each of the forwarding table items includes information of a preferred route and a secondly-preferred route.

The fault detection unit 602 is used to detect the operation status of the routings.

The route status setting unit 603 is used to set the status of the preferred route in the forwarding table item of the storage unit 601 as unavailable after the failure detection unit 602 detects that a failure occurs in the preferred route in the forwarding table item. After the status of the preferred route is set as unavailable in the forwarding table item, the route status setting unit 603 is further used to set the status of the preferred route in the forwarding table item of the storage unit 601 as available when the fault detection unit 602 detects that the preferred route restores to normal availability.

The service packet receiving unit 604 is used to receive a service packet.

The route status querying unit 605 is used to query the forwarding table item in the storage unit 601 that corresponds to a service packet after the service packet receiving unit 604 receives the service packet, determine whether the status of the preferred route in the forwarding table is available or not, and distribute the route information in the forwarding table to the service packet forwarding unit 606.

The service packet forwarding unit 606 is used for forwarding the service packet by using the preferred route when the route status querying unit 605 determines that the status of preferred route in the forwarding table item is available; and forwarding the service packet by using the secondly-preferred route when the route status querying unit 605 determines that the status of preferred route in the forwarding table item is an unavailable status.

The storage unit 601 stores the information of each forwarding table item, and each of the forwarding table items includes information of a preferred route and a secondly-preferred route. After the fault detection unit 602 detects that a failure occurs in the preferred route, the route status setting unit 603 sets the status of the preferred routing in the forwarding table item of the storage unit 601 as unavailable.

After the status of the preferred route is set as unavailable in the forwarding table item, the route status setting unit 603 sets the status of the preferred route in the forwarding table item of the storage unit 601 as available when the fault detecting unit 602 detects that the preferred route restores to normal availability. After the service packet receiving unit 604 receives a service packet, the route status querying unit 605 queries the forwarding table item in the storage unit 601 that corresponds to the service packet, determines whether the status of the preferred route in the forwarding table is available or not, and distributes the route information in the forwarding table to the service packet forwarding unit 606.

When the route status querying unit 605 determines that the status of preferred route in the forwarding table item is available, the service packet forwarding unit 606 forwards the service packet using the preferred route; and if the route status querying unit 605 determines that preferred route in the forwarding table item is in an unavailable status, the service packet forwarding unit 606 forwards the service packet through the secondly-preferred route.

The method and network device for fast service convergence provided by the present invention has been described in detail above. Particular examples are used to illustrate the principle and the embodiments of the present invention. The above description of the embodiments is intended to be helpful for the understanding of the method of the invention and the essential spirit thereof. And for those skilled in the art, modifications can be made to the embodiments and the application scope according to the spirit of the invention. Therefore, the content of the specification should not be used to restrict the present invention.

What is claimed is:

1. A method for fast service convergence, used for communications between Autonomous Systems, comprising:

presetting, by an Autonomous System Border Router (ASBR), a route forwarding table including a forwarding table and a status table, each forwarding table item in the route forwarding table comprising information of a preferred route and a secondly-preferred route, wherein a primary out port index in the forwarding table is associated with status of out port in the status table, the port including a physical port, a logical channel or a next hop interface;

detecting, by the ASBR, the status of the preferred route in the forwarding table item, if a failure is detected in the preferred route, setting the status of the out port in the status table as unavailable;

receiving, by the ASBR, a service packet, and querying a forwarding table item in the route forwarding table corresponding to the service packet and finding the status of the corresponding out port according to the primary out port index, if the status of the out port in the status table is available, forwarding the service packet through the preferred route; if the status of the out port in the status table is unavailable, forwarding the service packet through the secondly-preferred route.

2. The method according to claim 1, wherein, each forwarding table item in the forwarding table includes incoming label information, and when the service packet is received, the forwarding table item in the route forwarding table corresponding to the service packet is queried in accordance with the incoming label information of the service packet.

3. The method according to claim 1, further comprising, detecting the status of the preferred route in the forwarding table item, if the preferred route restores to be available after the status of the preferred route has been set as unavailable in the forwarding table item, setting the status of the preferred route in the forwarding table item as available.

4. The method according to claim 1, wherein a detection method used in detecting the failure comprises one or any combination of:

Link Status Fast Report detection method, Bidirectional Forwarding Fast Detection method and Operations Administration and Maintenance Fast Detection method.

5. The method according to claim 1, wherein the status of the preferred route comprises one or any combination of:

a preferred route out interface status, a preferred route out tunnel status and a preferred route next hop reach status.

6. The method according to claim 1, wherein, when a primary route and a backup route are employed, the service packet is forwarded using the backup route after the status of the primary route interface is set as unavailable;

after the primary route restores to be available, the status of an out port in the status table item is set as available, and the service packet is switched back to and forwarded through the primary route.

7. The method according to claim 1, wherein when load sharing routes are employed, for each load sharing route, another load sharing route is selected as its backup route, and a forwarding table is generated having multiple primary and backup load sharing table items, when one of load sharing routes becomes unavailable, its backup route will immediately be used for the forwarding.

8. A network device enabling fast service convergence and used for communications between Autonomous Systems, comprising:

a storage unit configured to store a route forwarding table including a forwarding table and a status table, each forwarding table item comprising information of a preferred route and a secondly-preferred route, wherein a primary out port index in the forwarding table is associated with status of out port in the status table, the port including a physical port, a logical channel or a next hop interface;

a detecting unit configured to detect the operation status of the routes;

a route status setting unit configured to set a route status, wherein, if the preferred route is detected as available, the route status setting unit setting the out port in the status table as available, if a failure is detected in the preferred route, the route status setting unit setting the out port in the status table as unavailable;

a service packet receiving unit configured to receive a service packet;

a route status querying unit configured to query route information related to the service packet and obtain information to find the status of a corresponding out port according to the primary out port index; and a service packet forwarding unit configured to forward the service packet in accordance with the information obtained by the route status querying unit, wherein when the route status querying unit determines that the status of the out port in the status table is available, the service packet is forwarded through the preferred route; when the route status querying unit determines that the status of the out port in the status table is unavailable, the service packet is forwarded through the secondly-preferred route.

9. The network device according to claim 8, wherein, the network device is an Autonomous System Border router.

* * * * *